US009911096B2

(12) United States Patent
Desai et al.

(10) Patent No.: US 9,911,096 B2
(45) Date of Patent: Mar. 6, 2018

(54) AUTOMATED ELECTRONIC MANAGEMENT SYSTEM FOR INTERNATIONAL TRADE, LOGISTICS AND PRE-SHIPMENT INSPECTION

(71) Applicants: Somil Desai, Fulton, MD (US); Saureen Naik-Desai, Fulton, MD (US)

(72) Inventors: Somil Desai, Fulton, MD (US); Saureen Naik-Desai, Fulton, MD (US)

(*) Notice: Subject to any disclaimer, the term of this patent is extended or adjusted under 35 U.S.C. 154(b) by 108 days.

(21) Appl. No.: 15/135,076

(22) Filed: Apr. 21, 2016

(65) Prior Publication Data

US 2017/0053231 A1 Feb. 23, 2017

Related U.S. Application Data

(60) Provisional application No. 62/150,561, filed on Apr. 21, 2015.

(51) Int. Cl.
 *G06Q 10/08* (2012.01)
(52) U.S. Cl.
 CPC ............... *G06Q 10/087* (2013.01)
(58) Field of Classification Search
 CPC .................................. G06Q 10/025
 USPC .................................................. 705/28
 See application file for complete search history.

(56) References Cited

U.S. PATENT DOCUMENTS

2009/0037234 A1* 2/2009 Gabrielson .......... G06Q 10/025
 705/6

* cited by examiner

*Primary Examiner* — Russell S Glass
(74) *Attorney, Agent, or Firm* — Baker Donelson, PC; Royal W. Craig (57) ABSTRACT

A computerized system and method are provided for managing an inventory of cargo containers through the loading and pre-shipment inspection process. The computerized system may be an in-house programmed solution for real-time exchange of information in an organized manner between exporter and importer. The data and photographic documentary are automatically compiled into a formatted property inspection report that is automatically uploaded to a cloud-based server system. The photographic documentary is combined with other essential information including booking number, container number, seal number, weight, and company reference number, and made accessible at a web-based interface for turnkey management of an inventory of cargo containers.

18 Claims, 9 Drawing Sheets

QUOTE RESPONSES

10 RESPONSES

| COMPANY | CONTACT PERSON | USER RATING | QUOTE | COMMENT | CONFIRM |
|---|---|---|---|---|---|
| GlobalTranz | Glenda Fruitt | | | | |
| Phoenix AZ 85054 | gpruitt@globaltranz.com | | 227.72 USD | A&F Freight - 2 day | CONFIRM |
| | 7069563273 | | | | |
| CH Robinson | Justin Parr | | | | |
| Chicago IL 60514 | Justin.Parr@chrobinson.com | | 225.00 USD | | CONFIRM |
| | 800-429-5377 x 1303 | | | | |
| Estes Express Lines | Stephanie DeBerry | | | | |
| 12140 ST RT 7 | Stephanie.DeBerry@Estes-Express.com | | 288.96 USD | quote# 484260 | CONFIRM |
| Bejpre OH 45714 | 740-401-9410 | | | | |
| EXPRESS LOGISTICS | ARC CUNNINGHAM | | | RATE IS FOR BOTH SHIPMENTS. (ROUND | |
| WAUKEE IA 50263 | ACUNNINGHAM@EXPLOGISTICS.COM | | 530.72 USD | TRIP) | CONFIRM |
| | 855-333-4254 X 155 | | | | |
| Spot Freight Inc. | Mike Burns | | | Round trip: 26101 - 42101 = $292.64 (2 days) | |
| 445 North Pennsylvania Street | mburns@spotmyfreight.com | | 598.98 USD | 42101 - 26164 = $296.34 (2 days) | CONFIRM |
| Indianapolis IN 46204 | 317-452-4913 | | | | |
| TSC Container Freight | Brior Dolan | | | | |
| 1010 Highland Parkway | bdolan@scowler.com | | 670.00 USD | for the round trip | CONFIRM |
| Downers Grove Illinois 60515 | 630-874-2918 | | | | |
| Transit Air Cargo | Angela Morgan | | | | |
| 2204 E 4th Street | AMorgan@transitair.com | | 1000.00 USD | Round trip | CONFIRM |

AUTOMATED ELECTRONIC MANAGEMENT SYSTEM FOR INTERNATIONAL TRADE, LOGISTICS AND PRE-SHIPMENT INSPECTION

CROSS-REFERENCE TO RELATED APPLICATION(S)

The present application derives priority from U.S. provisional application Ser. No. 62/150,561 filed 21 Apr. 2015.

BACKGROUND OF THE INVENTION

1. Field of the Invention

The present invention relates to an electronic management system for trade and logistics including complex pre-shipment inspection of recycling scraps and other commodities and, more particularly, to a computer system and method for guided-compilation and automated assemblage of a photographic loading report using a handheld computer device. By the use of a handheld computer device and/or web based portal the present invention also enables users to send out rate requests and facilitates bids by logistics service providers.

2. Description of the Background

Scrap recycling is a $90 billion industry in the United States that annually transforms more than 135 million metric tons of obsolete materials from consumers, businesses, and manufacturers into useful raw materials that are essential to the manufacturing of new products. The scrap recycling industry is global, and there is an established global supply chain for commodities ranging from iron and steel to paper; nonferrous metals such as aluminum, copper, and zinc; plastics; electronics; rubber; and more. Figures from the U.S. Census Bureau and the U.S. International Trade Commission show that in 2013, the United States exported 42.8 million metric tons of commodity grade scrap to 160 destinations worldwide for the manufacture of new products. These activities generated $24 billion in export sales and significantly helped the U.S. trade balance. In fact, in terms of volume, scrap materials are among the nation's largest commodity exports. [From ITC Trade DataWebsite]

Such cargo can not be exported from a country or imported into another without customs control. Documents need to be processed through the official customs offices, and spot-checks of the goods are sometimes carried out to assess the conformity of the cargo with the description given on the documents. In addition, pre-shipment inspections (PSI) are required when mandated by the government of the importing country. Governments assert that pre-shipment inspections ensure that the price charged by the exporter reflects the true value of the goods, prevent substandard goods from entering their country, and mitigate attempts to avoid the payment of customs duties.

There are several independent, third party inspection and certification organizations devoted to pre-shipment certifications and inspections. For example, the largest scrap importer by far is China, and the China Certification and Inspection Group Company (CCIC) is accredited by the People's Republic of China to perform all pre-shipment inspections. Indeed, CCIC has been operating since 1980 and has grown and become the dominant worldwide pre-shipment certification and inspection authority for scrap exports. If you plan on exporting recyclables to China or most other countries, your cargo must first pass their pre-shipment inspections to ensure that the cargo you ship abides by environmental laws and regulations of the importing country. The importer is generally responsible for arranging the pre-shipment inspection, but the exporter must make the goods available for inspection in the country of origin and provide the inspecting authority with a photographic pre-shipment 'Self Inspection Report', which is sent to the inspecting authority.

Each CCIC applicant must provide a Self-inspection Report to CCIC. The self-inspection inspection report includes an array of loading photos taken to specification. The Applicant submits the Self-inspection Report to CCIC electronically, and CCIC sends back a draft inspection certificate.

On the basis of the inspection certificate, the inspection is performed, and if no discrepancies are noted and all final documents are received from the importer and exporter, a "Clean Report of Findings" is issued confirming the shipment's value, customs classification, and clearance. The goods may then be shipped to the importing country, and the importer uses the inspection report to get the imported goods released from customs.

Unfortunately the self-inspection report must comply with very specific requirements. All loading photos must be unprocessed original photos with a resolution no smaller than 640×480; they must be in color and provide a clear view of the loaded material and its state. Blurry photos that fail to display the material clearly will not be accepted. Multiple loading photos should be submitted for every container showing it empty, 25% full, 50% full, 75% full, 100% full, both doors shut, left door shut, right door shut, and sealed. If the material is packed in bags or boxes, photos showing material inside the bags or boxes should be provided. The pre-loading photos are an absolute necessity.

CCIC often rejects applications and/or withholds certificates in the event of inadequate or substandard photos, and the delay can result in significant financial or other losses.

What is needed is an automated system and method for managing an inventory of cargo containers through the loading and pre-shipment inspection process, including compiling and assembling a photographic pre-shipment inspection report to detailed standards using a handheld computer device. This would be especially helpful to scrap commodity brokers who at time of loading must take correct loading photos, and currently use digital cameras. There is a tremendous amount of wasted time involved in managing an inventory of cargo containers, including through the loading and pre-shipment inspection process, inclusive of manually using a digital camera, then having to upload the photos, send them out, then repeat the process if the photos are non-conforming.

SUMMARY OF THE INVENTION

Accordingly, it is an object of the invention to provide a computerized system and method for managing an inventory of cargo containers, including through the loading and pre-shipment inspection process. The present invention does this with a computerized system that will allow individual brokers, warehouse personnel, and company representatives to capture these images correctly and upload to their own front end server that may be managed internally by the exporter, or alternatively by an Application Service Provider (ASP), a business providing computer-based services to customers over a network. The system provides the individual with access to the information in real-time 24/7 and allows them in an organized manner to send to other inspection agencies for approval or to the customs broker or the business owner in the importing country for final review.

The data and photographic documentary are automatically compiled into a formatted property inspection report that is automatically uploaded to a cloud-based server system. The photographic documentary is combined with other essential information including booking number, container number, seal number, weight, and company reference number, and made accessible at a web-based interface for turnkey management of an inventory of cargo containers. The computerized system and method are especially beneficial to commodity brokers. At the time of loading the invention assist them in taking the correct loading photos from their mobile device, and they have a copy automatically sent to themselves and also directly to their customer as soon as the photos are taken at the warehouse. The streamlined process gives the importer all the container and loading information needed much more quickly so that they can prepare on their end. This alleviates wasted time from using a digital camera, uploading photos online, and repeating for mistakes.

For a more complete understanding of the invention, its objects and advantages refer to the remaining specification and to the accompanying drawings.

BRIEF DESCRIPTION OF THE DRAWINGS

Other objects, features, and advantages of the present invention will become more apparent from the following detailed description of the preferred embodiment and certain modifications thereof, in which.

DETAILED DESCRIPTION OF THE PREFERRED EMBODIMENTS

The present invention is a computerized system and method for managing an inventory of cargo containers and particularly for compiling a pre-shipment loading documentary using a handheld device and a remote database. The system guides and facilitates data collection using mobile devices in the field to collect cargo container inspection data and construct a specific photographic documentary.

For purposes of description, the following definitions are herein provided:

"Container" or "Sea-Freight Container" is a metallic box (steel or aluminum) with a double door at one end and in which general cargo can be safely loaded and transported. Container dimensions are standardized and most are either 20 foot or 40 foot containers.

"Bill of Lading" (B/L) is a contract between the owner of the goods and the carrier. A straight bill of lading is non-negotiable. A negotiable or shipper's order bill of lading can be bought, sold, or traded while goods are in transit and is used for many types of financing transactions.

The present system is designed for inhouse use of an exporter of scrap materials such as plastic, paper, rubber, metal, insulated wire, etc., and it provides an organized integrated tool for the exporter to properly compile a pre-loading documentary inclusive of export loading photos using authorized client devices such as smart phones, and directly email it to his customer (importer) in real time for final review. The pre-loading documentary inclusive of photos are saved to a third-party centralized repository and management system (RMS) that is specifically designed and empowered to securely and reliably store any such documentary for its full effective life (the "Record Repository") wherein the pre-loading documentary can be retrieved anytime.

The web-based RMS provides a secure web portal for exporter/subscribers, and is also integrated with the subscriber/exporter's mobile client devices via a mobile application downloaded thereto. Thus, subscriber/exporters can access the RMS through any web-enabled client device via the secure web portal (e.g. a Web browser on the subscriber/exporter's computer), and/or by their mobile client devices running the mobile client application. This way the RMS provides a platform for the subscriber/exporter to manage their inventory of cargo containers, including navigating each container's loading and pre-shipment inspection process. The RMS enables the subscriber/exporter whose information is being managed to provide secure access to the appropriate container information subject to appropriate permissions.

Figure 1:
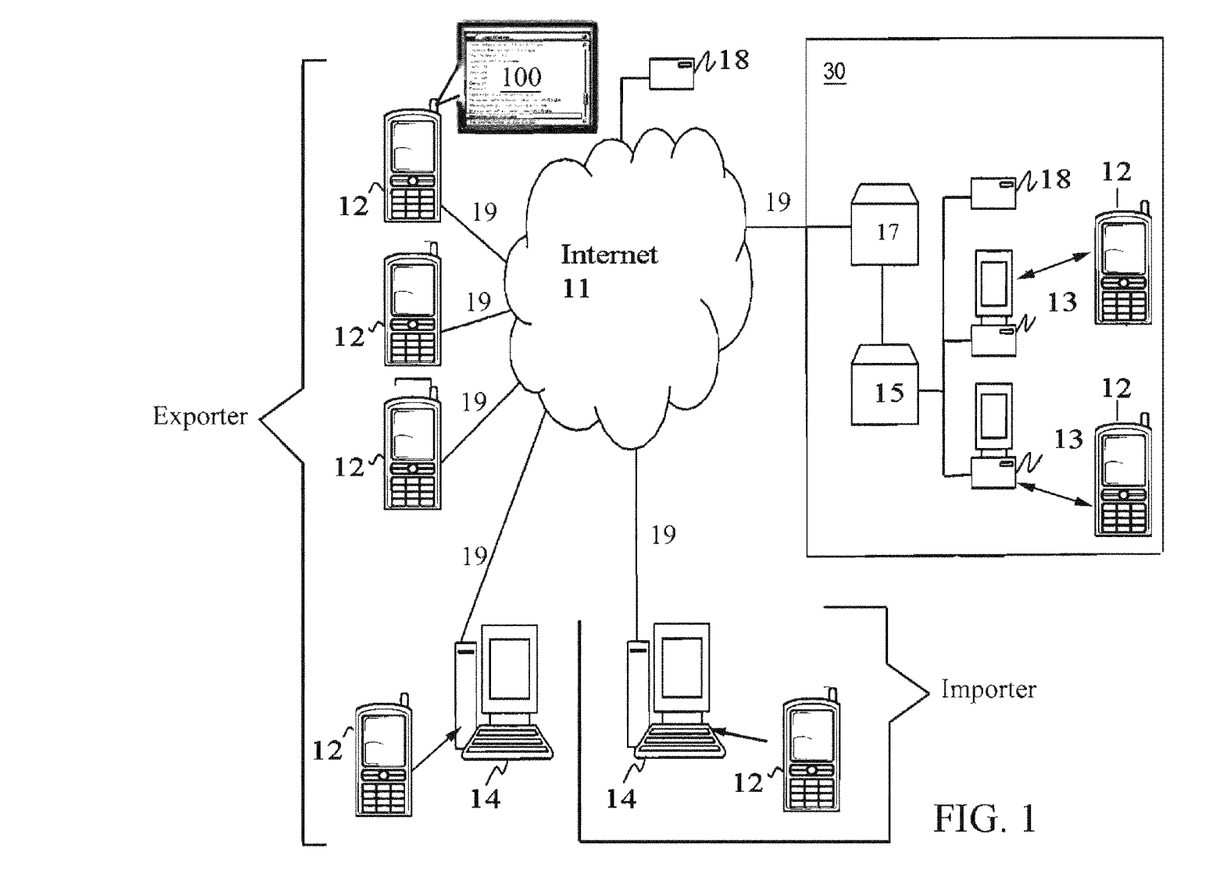
FIG. 1 is an illustration of the hardware architecture according to the present invention.

FIG. 1 is an illustration of the hardware architecture according to the present invention, in which the RMS 30 is a distributed client-server hardware architecture that establishes a communication platform between a subscribing exporter and their customer/importer. The system architecture includes a plurality of client workstations 14 connected to RMS 30 via an internet backbone, and/or through a plurality of portable devices 12, which may be any web-enabled camera-equipped device including PDAs, cell phones and the like, or laptop/stationary personal computers. The portable devices 12 run a ShipLync™ mobile application 100 that interfaces with a web-based application resident at RMS 30, which is managed internally by an application service provider (ASP). ShipLync™ application 100 selectively gathers, consolidates and distributes loading information including a CCIC-compliant photo documentary into a container record repository 18 resident in RMS client-server network 30, as well as to clients of the exporter/subscriber.

Groups of client workstations 14 are also connected to client-server network 30 via an internet backbone, while local client workstations 13 may be locally connected directly to the RMS client-server network 30. The RMS client-server network 30 includes a web-enabled server 15 connected to the internet 11 through a secure gateway 17. Secure gateway 17 hosts a resident permissions database which stores data authentication and verification information (usernames and passwords) correlating to registered subscriber/exporters. The internet, or World Wide Web 11 provides a known system for interconnecting portable devices 12 and client workstations 14 in a communicating relationship.

Secure communication lines 19 may be used between portable devices 12, client workstations 13 and client-server network 30 so that private data remains so. Moreover, the secure gateway 17 hosting a resident permissions database also provides a secure gateway which ensures security of data as well as operating compatibility between the RMS client-server network 30 and the internet 11.

The container records repository 18 comprises a database server in communication with non-transitory computer memory, which may be local or any distributed storage array. The database server runs database management software to provide database services to RMS client-server network 30. Database management systems (DBMSs) frequently provide database server functionality, and some DBMSs (e.g., MySQL) rely exclusively on the client-server model for database access. Thus, container records repository 18 preferably hosts a network database on the non-transitory computer memory, preferably an SQL server database, running MySQL (a popular open source database). Other examples of suitable database servers are Oracle™, DB2™, Informix™, Ingres™, and SQL Server™. As shown in FIG. 1 the container records repository 18 may be a part of the local client/server environment 30, but may alternately be a cloud-based repository 18 connected directly to the internet 1.

The secure gateway 17 with routing database may be a Citrix Access Gateway®, or other suitable secure data access solution that provides RMS administrators via local workstations 13 with software and data-level control while providing the exporter's shipping agents using portable devices 12 with remote access for securing the delivery of data to container records repository 18.

The subscriber/exporter's client/importer's also have access to the loading information and photo documentary in container record repository 18 resident in client-server network 30 via their own portable devices 12 running a ShipLync™ application 100 or by client workstations 14, either of which interface with the web-based application resident in a client-server network 30.

Figure 2:
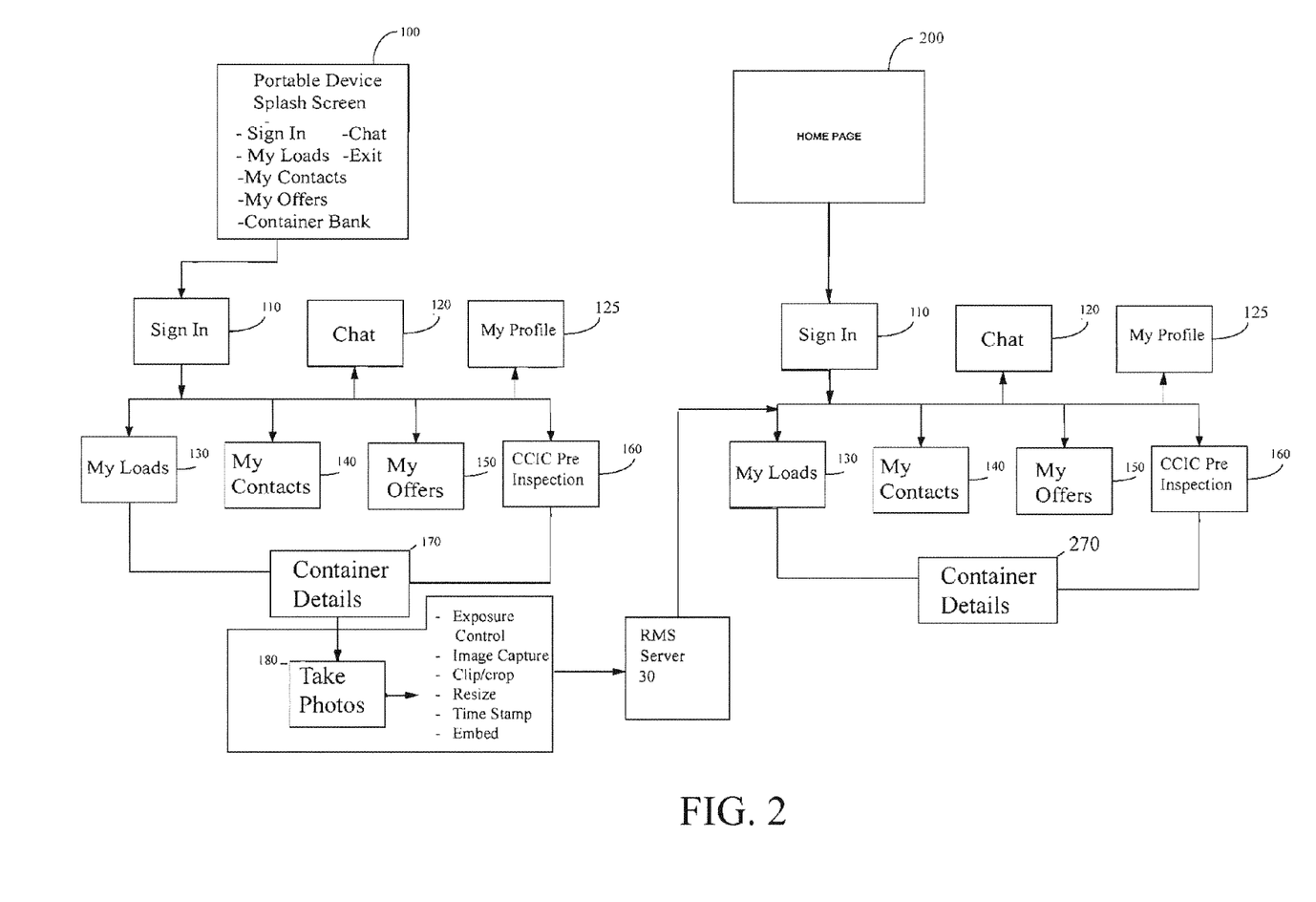
FIG. 2 is a block diagram of the method of managing container loading information and generating a property loading report.

Generally, the present invention provides an electronic management system for scrap recycling logistics and pre-shipment inspection that compiles, generates and manages pre-shipment loading reports including CCIC-compliant photographic documentary, all generated in real time at the place of inspection. The software method of the invention is implemented as a combination of the ShipLync™ mobile application 100, RMS secure web portal (via Web browser on the subscriber/exporter's computer), and RMS server software, the three of which are integrated by and through the foregoing network. Initially, a new exporter/user gains first access by registering and creating their own account, enrolling with an email address, username and password. For security, the secure gateway 17 of RMS 30 sends an activation link URL to the email address. The user must click the activation link from within a web browser on their client workstation 14 to activate their account. Once subscribed, the RMS web portal prompts the subscriber/exporter to download the ShipLync application 100 to one or more of their portable devices 12. They complete this step and install the ShipLync application 100, then enroll their subscription username and password into the ShipLync application 100 setup screen. This integrates portable devices 12 running the ShipLync™ application 100 and client workstation(s) 14 which interface with the web-based application resident in a RMS client-server network 30. FIG. 2 is a tree diagram of the method of managing container loading information and generating a property loading documentary in accordance with the invention, a subscriber/exporter employing their enrolled portable device(s) 12 as above to interface and exchange loading data with the RMS client/server environment 30 or cloud-based repository 18 connected via the internet 11.

Figure 3:
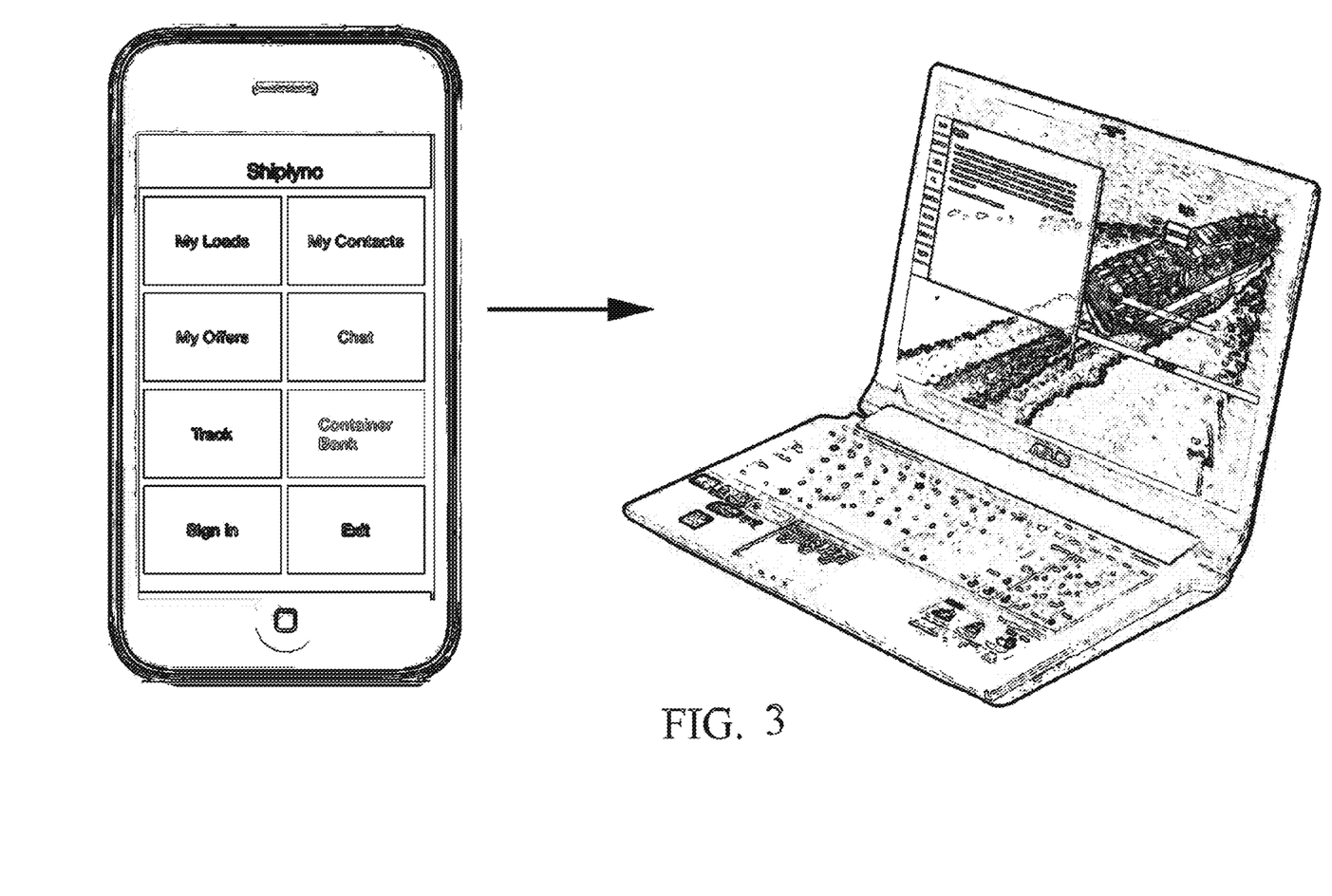
FIG. 3 is a perspective view of the portable device 12 and web-based user-interface combination.

As seen to the left of FIG. 2, the user takes device 12 to a required container location and at step 100 executes the ShipLync application. At step 100 this engenders the splash screen as shown in FIG. 3 which presents eight options: 1) Sign-in 110; 2) CCIC Pre Inspection 160; 3) My Loads 130; 4) My Offers 150; 5) My Contacts 140; 6) My Profile 125; 7) Chat 120; and 8) Exit. These same options are likewise available on the RMS 30 secure web portal (via Web browser on the subscriber/exporter's computer 14).

Figure 4:
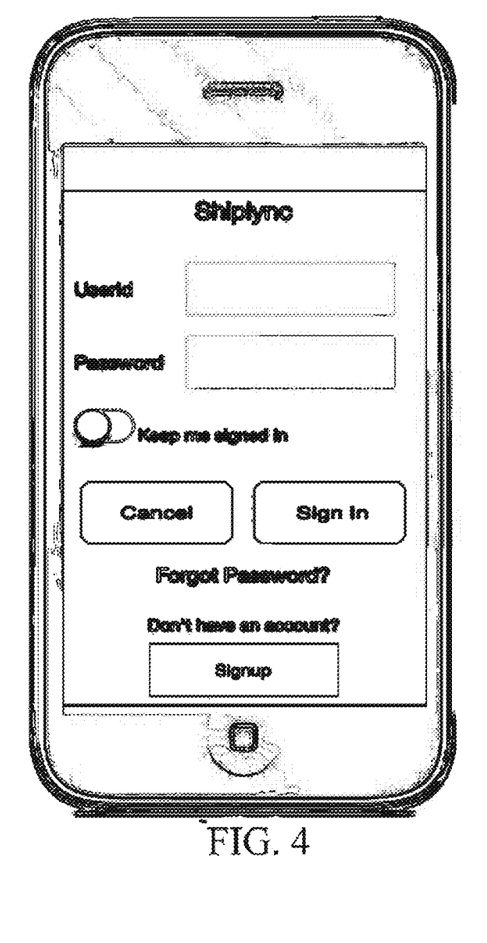
FIG. 4 is a screen-print of the sign-in screen.

Pressing Sign-in at step 110 presents the sign-in screen in FIG. 4, which solicits entry of username and password. In addition a signup option is provided for unregistered users and an email password recovery option that sends an e-mail message with forgotten password. Once signed in, a subscriber/exporter can choose to keep their mobile devices 12 permanently signed in.

Pressing "Chat" at step 120 provides access to a chat room for user-conferencing, including real-time online chat and online interaction via instant messaging and online forums so that users connected by a shared interest can share ideas on that interest.

Pressing "My Profile" at step 125 allows the subscriber/exporter to enter business information inclusive of name, address, contact info, username, password, etc. This information can be easily accessed by the subscriber/exporter and updated.

Pressing "My Contacts" at step 140 initiates a contact manager program, e.g., a software program that enables users to easily store and find contact information, including names, addresses and telephone numbers.

Pressing "My Offers" at step 150 initiates an auction-style listing of offers on the users negotiable B/Ls, which can be bought, sold, or traded while goods are in transit. Whenever a subscriber/exporter seeks to ship cargo from point A to point B, they will seek the best rate. The ShipLync system provides an offer/bid clearinghouse for logistics agents who can submit bids in real time. My Offers 150 facilitates a domestic bidding operation by which the subscriber/exporter can submit a request for a quote, and which provides a tracking capability as quotes are being received from other registered logistics professionals. The ShipLync system creates a legally binding contract between a selected logistics agent and subscriber which auto populates into a PDF format document confirming contract details such as rate, pick-up and delivery address between both parties. The parties need only esign or manually sign and upload to the RMS server 30 for storage.

Figure 5:
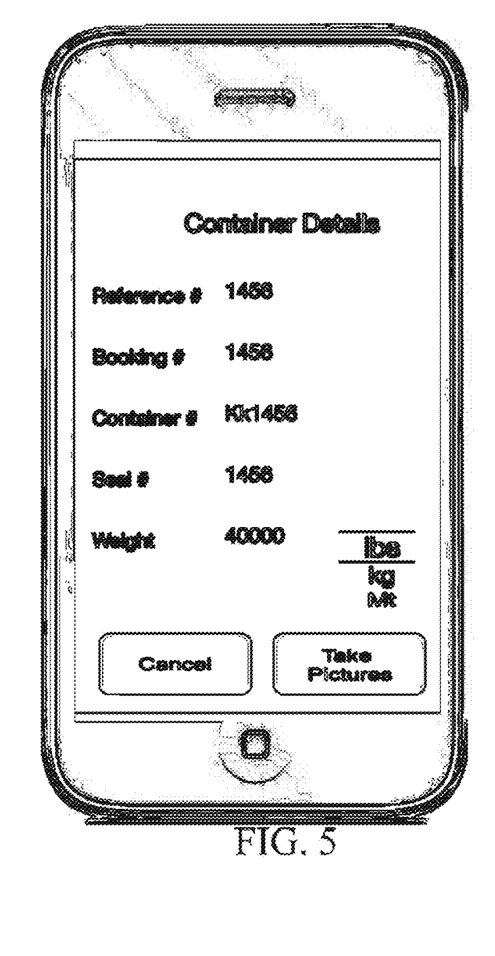
FIG. 5 is a screen-print of the container details listing screen.

Pressing "My Loads" at step 130 initiates a listing of the user's containers including each container's reference number, booking number, container number, seal number and weight. This section also provides a query or search option that provides a lookup by container reference number, booking number, container number, seal number and weight. By either route the user can drill down at step 170 to the specific details of any container reference number, booking number, container number, seal number and weight. A container details listing screen is shown in FIG. 5.

In order to compile a loading photo documentary, the user presses the CCIC Pre-Inspection button at step 160. They can access a pre-existing documentary as per step 170 by entering container reference number, booking number, container number, etc. Alternatively they can click "Create A New Loading Doc" and enter such load details anew. The ShipLync application 100 requires entry of PO number, Booking and Container numbers, Seal number, and weight with units in respective text fields. The ShipLync application 100 then prompts the subscriber/exporter to take three (3) photos showing the commodity inside the Gaylord boxes or super sacks that are being loaded.

Figure 6:
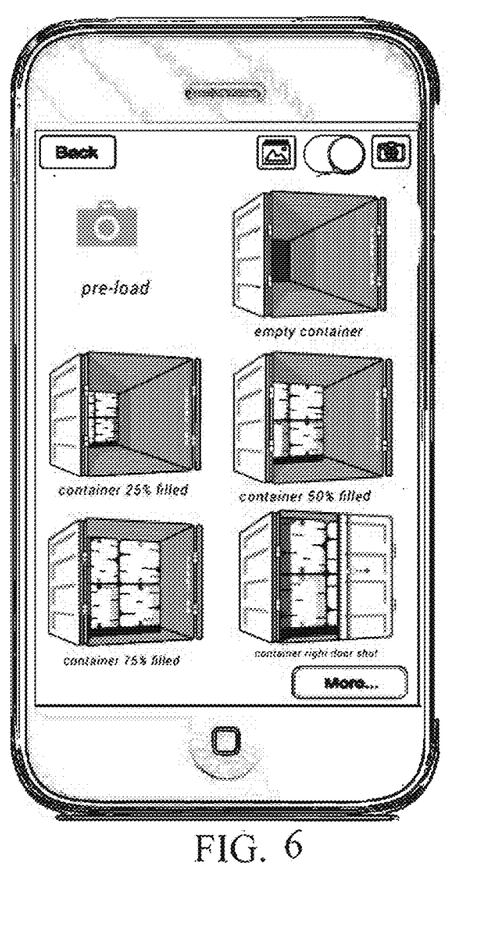
FIG. 6 is a screen-print of the photo collection screen unpopulated.

Specifically, the "Take Pictures" button at step 180 (see also FIG. 5 bottom right) initiates a user-guided photo collection process using the portable device 12 integrated digital camera. As shown in FIG. 6, the photo collection screen comprises a mosaic of cartoon-illustrated icons each specifying a particular perspective and loading stage for the taking a photo of a shipping container. The ShipLync application 100 prompts the subscriber/exporter to take a plurality of photos (preferably three) replicating the perspective of each icon and automatically enforces that the following portfolio of photos be taken in full compliance with the loading photo requirements for CCIC:

1. Empty container showing the container nos. on the right hand side inner wall
2. Start of loading showing the container nos. on the right hand side inner wall
3. Container 25% loaded showing the container nos. on the right hand side inner wall
4. Container 50% loaded showing the container nos. on the right hand side inner wall
5. Container 75% loaded showing the container nos. on the right hand side inner wall
6. Container fully loaded with both doors open
7. Container fully loaded with right door closed so the container nos. show
8. Container with both doors closed
9. Seal photo (The seal number is molded into the plastic tie-strap used to seal the container);
10. At least 3 shots showing the commodities inside the Gaylord boxes that are being loaded.

Importantly, all loading photos must be dated and this is accomplished by the ShipLync™ application resident on portable device 12 which time-tags each photo for reference.

The subscriber/exporter presses on a particular icon to indicate that this is the photo (perspective and loading stage) about to be taken, and this initiates the integrated camera software to take a picture. They are guided to take three (3) photos for each icon, and are warned that each photo taken should show the container number which is stenciled to the right wall of the container. After each photo clicking on Save and Preview ensures that everything is correct. In one embodiment the ShipLync™ application resident on portable device 12 automatically employs pattern recognition techniques scan the photo to ensure that the container number is present therein. There is also an Edit button to correct mistakes if any. In an embodiment, the ShipLync™ application resident on portable device 12 can perform the following sub-tasks all automatically or with minimal user-guidance:

Exposure Control: the ShipLync™ application automatically controls the integrated camera aboard portable device 12 to control shutter speed and aperture of the camera. For example, the focus, aperture, and shutter speed of the camera are set to optimal values based on algorithms that evaluate a preview image and/or readings available to the camera (e.g., GPS coordinates, brightness information, field of view, aperture, shutter speed, focus, gyroscope information, orientation information, etc.).

Image Capture: once the exposure control settings are fixed, and as soon as the image stabilizes, the ShipLync™ application automatically controls the shutter of the camera to capture an image, and stores the captured image.

Clip/crop: The ShipLync™ application executes an automatic clipping/cropping/distortion correction algorithm to crop the captured image to remove featureless regions (e.g., by small local variance or high frequency metrics), crop the image to show primarily the closest container area and may perform distortion correction on the image.

Resize: The ShipLync™ application executes an automatic size correction algorithm to resize the captured/cropped image to a 3"×3" square.

Time Stamp: The ShipLync™ application time stamps each 3"×3" square photo (see FIG. 7)

Embed: the edited/time stamped photos are embedded (locally by the ShipLync™ application) into a reference document, preferably, for example, an Adobe PDF® form file stored in memory.

The ShipLync application 100 automatically customizes the permissions for the PDF loading documentary, enabling or disable users from performing certain actions (such as printing, editing the document, or copying text);

The ShipLync application 100 automatically instantiates pattern recognition on each phot in accordance with an associated set of requirement for that photo. For example this self-authenticates that the seal photo actually shows the seal number molded into the plastic tie-strap used to seal the container, and that each of the loading shots is properly time-tagged each photo for reference.

In addition to the PDF-embedment, the proper icon on the on-screen display is immediately repopulated with a thumbnail of the photo linking to the full size 3"×3" 640×480 pixel photo stored in memory. This is illustrated in FIG. 7.

Figure 7:
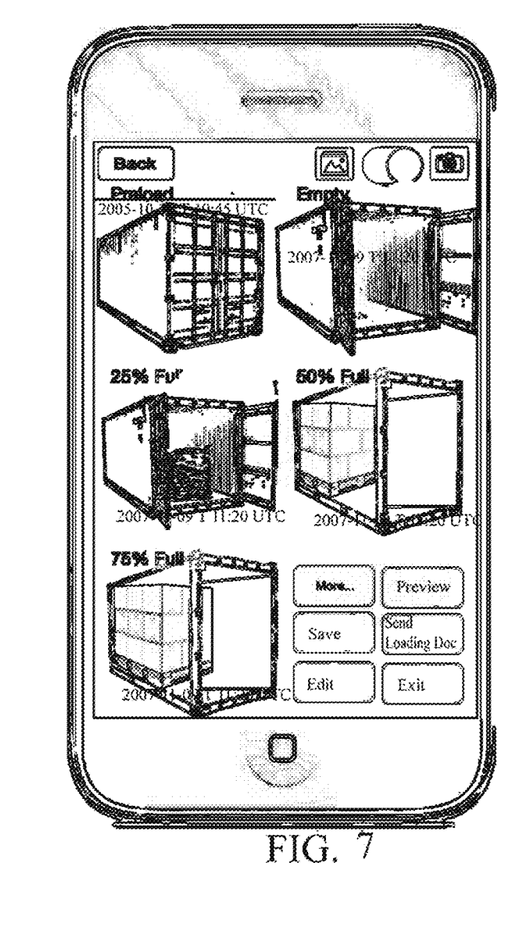
FIG. 7 is a screen-print of the photo collection screen partially populated.

By the foregoing process, as seen in FIGS. 6-7, the software progressively repopulates the entire mosaic with the appropriate time-stamped photographs of the container loading process. The photographic documentary is combined with other essential information including booking number, container number, seal number, weight, and company reference number. Note also that both the on-screen display and the Adobe PDF® form file stored in memory are pre-populated with loading references (Preload, Empty, 25% Full, 50% Full, 75% Full) and on the PDF photographic documentary these loading references are embedded as labels corresponding to the different photos. This in combination with the custom security controls and automatic photo timestamps makes it extremely difficult to substitute a photograph taken earlier or later for the inspection photograph. Even if this did occur, the time-stamp on the photograph would need to match what is described in the text.

Once done, the ShipLync application 100 automatically compiles the photo documentary, handshakes with the RMS Server 30, and the RMS server uploads the fully formatted loading documentary to record repository 18. The report includes all essential information including booking number, container number, seal number, weight, and company reference number. An advantage of such an arrangement is that image and text data (date stamp) is contemporaneous, authenticated, and cannot be altered without a record of alteration being made. This provides inherent reliability.

The portable device 12 ShipLync™ application 100 includes a text/email function that allows the user to text or email a copy of the populated Adobe PDF® loading report file any other contact, either manually entering contact information or choosing from the Contact list. To illustrate, as seen in FIG. 7 the user clicks on Send Loading Doc and selects a contact from the My Contacts section 140 or enters a new email address, and the ShipLync application 100 both sends the photo loading documentary as indicated and uploads it to RMS server 30. The subscriber/exporter can then download the PDF copy of the loading documentary whenever they need it from the My Loads section 130 (FIG. 2).

As described earlier in FIG. 3, the portable device 12 ShipLync™ application 100 interfaces with the web-based application resident in a client-server network 30, automatically uploading the populated Adobe PDF® loading report file into the container record repository 18 resident in client-server network 30. The client-server network 30 also provides a web-based interface for turnkey management of an inventory of cargo containers.

When users visit the site/application as at step 200 (FIG. 2), they will see the landing page with marketing content (FIG. 3).

Figure 8:
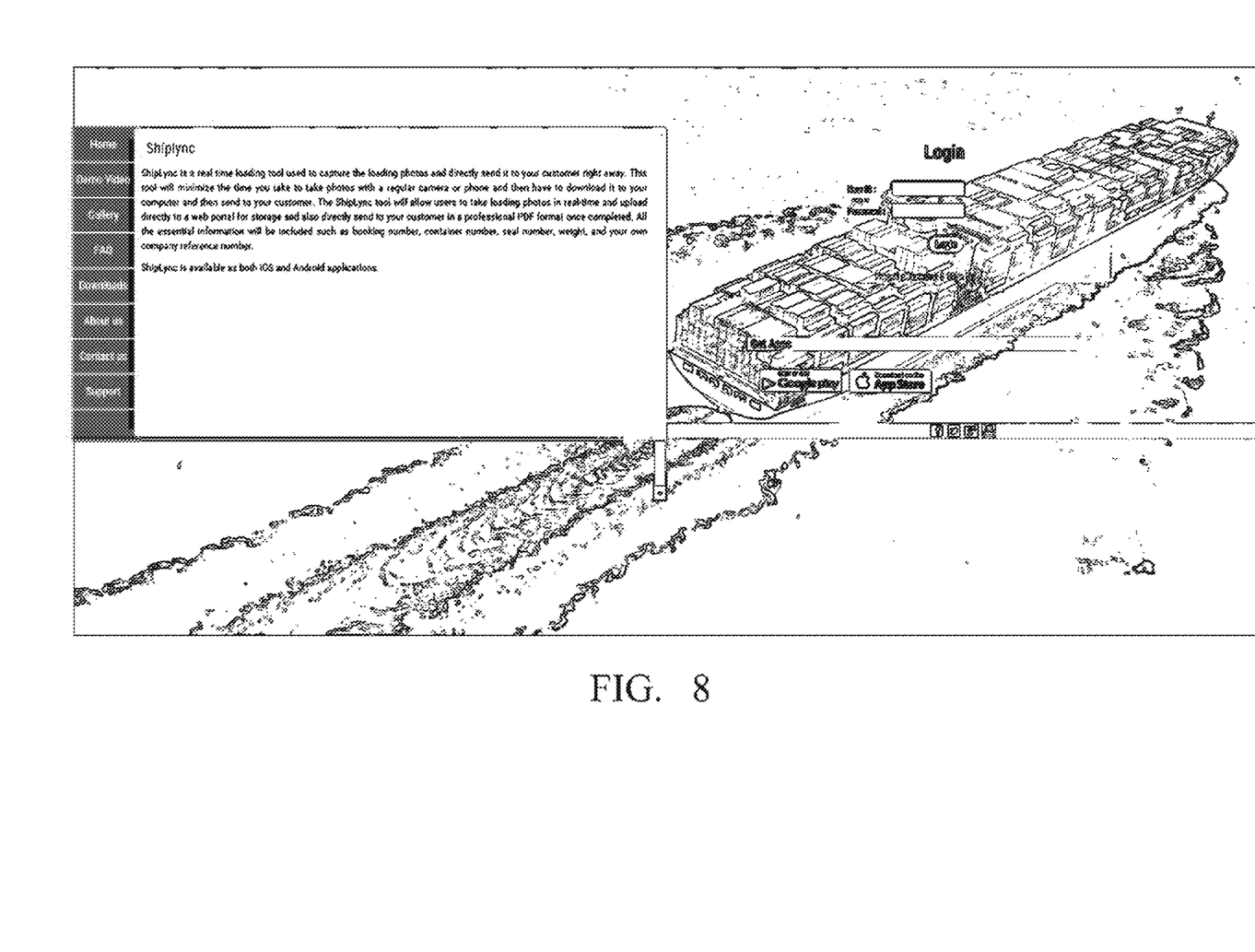
FIG. 8 is a screen-print of the ShipLync™ web-interface landing page.

FIG. 8 is a screen-print of the ShipLync™ web-interface landing page. The landing page also invites users to either (i) sign in, which will be applicable to users who have already registered, or (ii) register.

Figure 9:
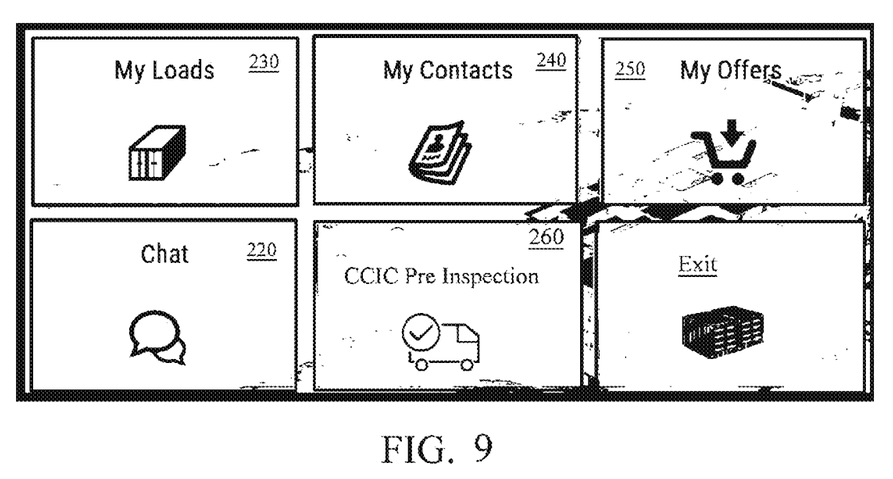
FIG. 9 is a screen-print of the ShipLync™ menu options page.

Once logged in, at step 210 this engenders the splash screen as shown in FIG. 9 which presents the same options: 1) Chat 220; 2) My Loads 230; 3) My Contacts 240; 4) My Offers 250; 5) CCIC Pre Inspection 260; 6) My Profile 225; and 7) Exit. As seen to the right of FIG. 2, pressing "Chat" at step 220 provides access to the chat room for user-conferencing, including real-time online chat and online interaction via instant messaging and online forums so that users connected by a shared interest can share ideas on that interest.

Pressing "My Contacts" at step 240 initiates the contact manager program (described previously).

Pressing "My Offers" at step 250 initiates the auction-style listing of offers on the users negotiable B/Ls (described previously).

Figure 11:
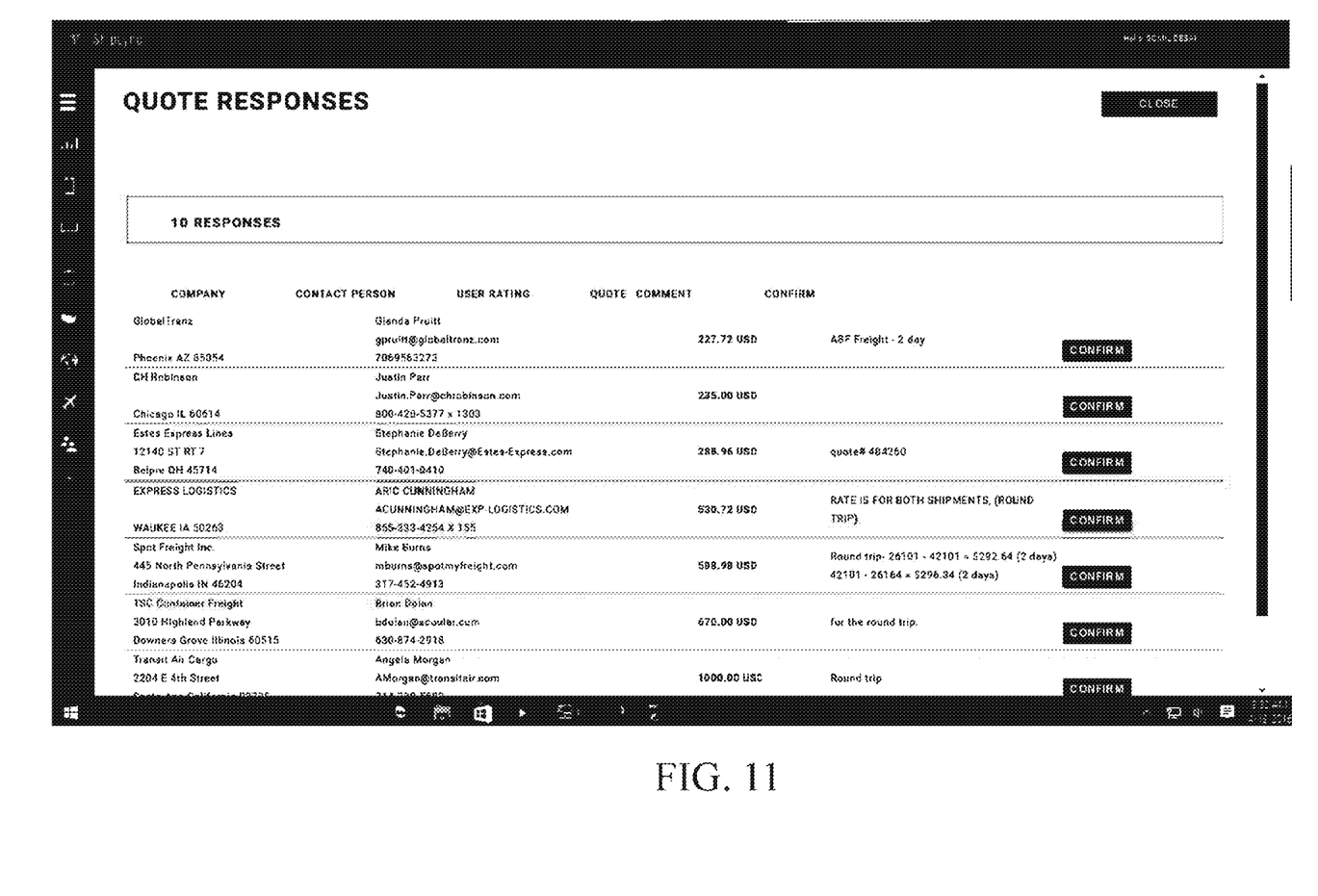
FIG. 11 is a screen print of the My Offers screen.

FIG. 11 is a screen print of the My Offers screen which is an auction-style listing of offers submitted by the subscriber/exporter to logistics agents. The interface is interactive and, as seen at top, provides an offer/bid clearinghouse for logistics agents. These agents can submit bids in real time, and as shown at top there are 10 responses. The listing identifies the logistics agents by company, contact, user rating, quote amount, and comments. In addition, a Confirm/Cancel button appears at far right. Should the subscriber/exporter choose to confirm a bid, they press confirm and the RMR 30 will produce a legally binding contract between the selected logistics agent and subscriber which auto populates into a PDF format document confirming contract details such as rate, pick-up and delivery address between both parties. The parties need only esign or manually sign and upload to the RMS server 30 for storage.

Pressing "My Loads" at step 230 initiates a query of that logged user's containers, which displays a listing with a lookup by container reference number, booking number, container number, seal number and weight. Again, by either route the user can drill down at step 270 to the specific details of any container reference number, booking number, container number, seal number and weight.

Figure 10:
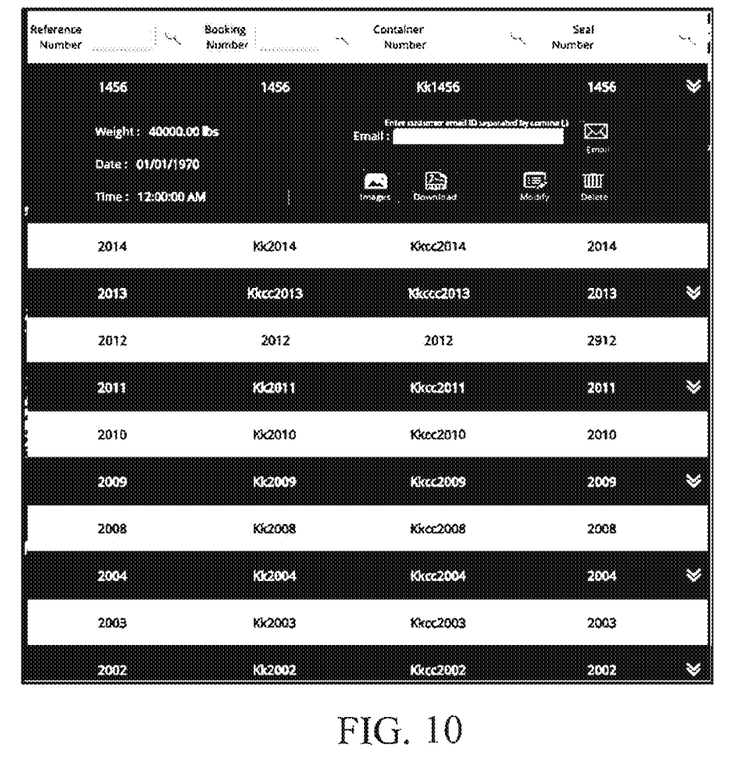
FIG. 10 is a screen-print of the web version of the container details listing screen.

The web version of the container details listing screen is shown in FIG. 10. The logged user has a control panel that facilitates several direct actions with regard to the selected container. The logged user can view the loading photos, download the Adobe PDF loading report, email the report to a contact, modify the container loading record, or delete it.

Pressing "Containers Info" at step 260 initiates a query of all containers (not just the logged users) and provides a lookup by container reference number, booking number, container number, seal number and weight. Again, the user can still drill down at step 270 to the specific details of any container reference number, booking number, container number, seal number and weight. Embedded within the "Containers Info" step 260 is a container tracking feature. Thus, pressing a "Track" button instantiates a map display that shows one or more selected containers on a world map.

Figure 12:
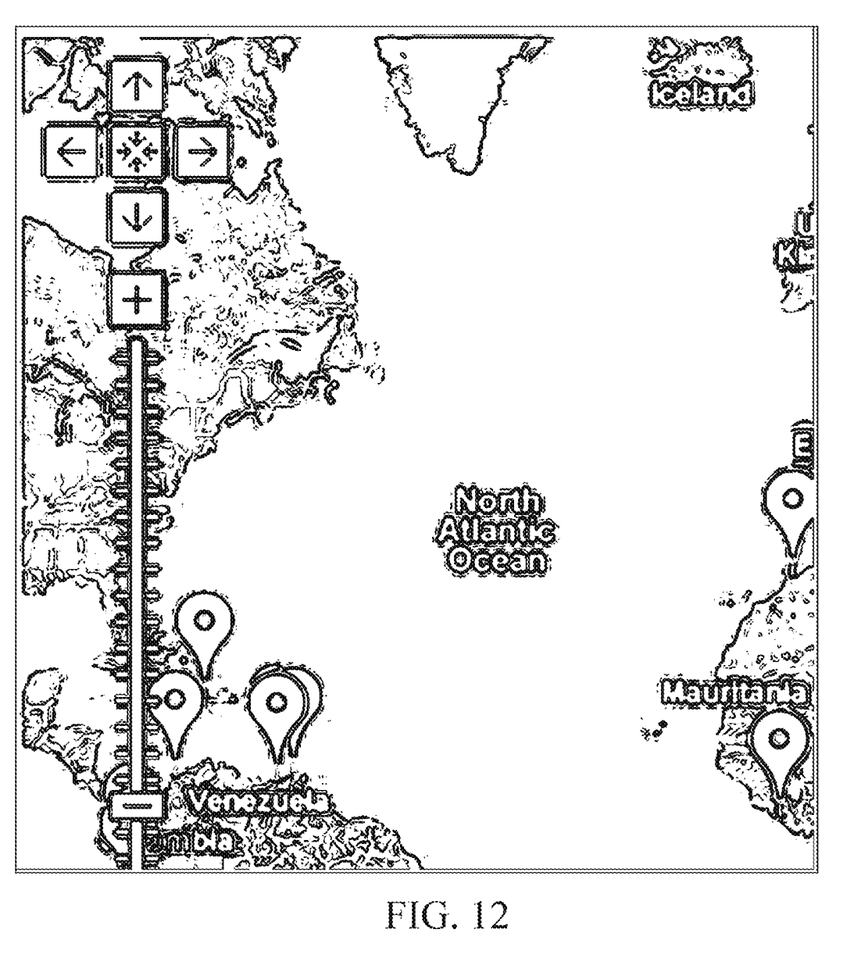
FIG. 12 is a screen-print of the track container screen.

FIG. 12 is a screen print of an exemplary map display. The present system uses the (Google Maps API (Application Programming Interface) to draw the containers as shown. Again, by clicking on any desired container the user can drill down to the specific details of any container reference number, booking number, container number, seal number and weight.

It should now be apparent that the above-described computerized system and method allows management of an inventory of cargo containers and compilation of a pre-shipment loading report using a handheld device and a remote database. The system guides and facilitates data collection using mobile devices in the field to collect cargo container inspection data including a specific photographic documentary.

It should further be appreciated that the present invention can readily have further features added to it as the functionality of handheld computers, and the costs thereof, change over time. All such straight forward additions and modifications fall within the scope of the present invention. Further, it is noted that the example described above may need to be altered in detail or in substance, depending upon the specific capabilities and software of the particular hand held device used.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A computer method for automated management of container loading information and generating a property loading documentary assessment, comprising the steps of:
   providing subscriber access to a record management service (RMS) via an internet backbone from a plurality of portable devices and client workstations;
   registering a subscriber having at least one mobile client device and at least one client workstation;
   downloading a mobile application to said subscriber's mobile client device that is configured to interface with a web-based application resident at said RMS via said internet backbone, said mobile application comprising computer instructions stored on non-transitory computer memory for completing the substeps of, guiding a user to capture a plurality of photographic images of a shipping container, automatically time-tagging and authenticating each of said plurality of photographic images, enter a booking number, container number, seal number, weight, and company reference number, automatically formatting said plurality of images into a photo documentary report inclusive of said booking number, container number, seal number, weight, and company reference number, automatically uploading said inspection report to said RMS;

providing a web portal at said RMS comprising computer instructions stored on non-transitory computer memory for displaying a web-based interface for access by said subscriber to retrieve said photo documentary report, booking number, container number, seal number, weight, or company reference number and distribute said photo documentary report.

2. The computer method for automated management according to claim 1, wherein said mobile application comprises computer instructions stored on non-transitory computer memory for completing the substep of verifying that said user has captured a plurality of photographic images of a shipping container.

3. The computer method for automated management according to claim 2, wherein said mobile application verifies that said user has captured at least the following photographic images of a shipping container:
   a. empty container;
   b. start of loading;
   c. container 25% loaded;
   d. container 50% loaded;
   e. container 75% loaded;
   f. container fully loaded with both doors open;
   g. container fully loaded with right door closed;
   h. container with both doors closed; and
   i. sealed container.

4. The computer method for automated management according to claim 3, wherein said mobile application comprises computer instructions stored on non-transitory computer memory for verifying that said user has captured a container number in all of said plurality of photographic images of said shipping container.

5. The computer method for automated management according to claim 1, wherein said mobile application comprises computer instructions stored on non-transitory computer memory for automatically time-tagging all of said plurality of photographic images of said shipping container.

6. The computer method for automated management according to claim 5, wherein said mobile application comprises computer instructions stored on non-transitory computer memory for automatically uploading all of said plurality of photographic images of said shipping container to said RMS web portal.

7. The computer method for automated management according to claim 5, wherein said mobile application comprises computer instructions stored on non-transitory computer memory for pattern recognition to self-authenticate that the seal number is contained in the seal photo.

8. The computer method for automated management according to claim 7, wherein said mobile application comprises computer instructions stored on non-transitory computer memory for pattern recognition to self-authenticate that the time-tags are contained in the loading shots.

9. A computerized system for managing an inventory of cargo containers through the loading and pre-shipment inspection process, comprising:
   a plurality of mobile devices each comprising an integrated camera and a programmable controller programmed with control software comprising computer instructions stored on non-transitory computer memory for guiding a user to capture a plurality of photographic images of a shipping container and for formatting said plurality of images into a photo mosaic inspection report and for automatically uploading said report to a cloud-based server system; and
   a server system comprising control software comprising computer instructions stored on non-transitory computer memory for displaying a web-based interface for management of an inventory of cargo containers by said photographic documentary, booking number, container number, seal number, weight, or company reference number.

10. The computerized system according to claim 9, wherein said mobile computer software instructions verify that said user has captured said plurality of photographic images of a shipping container.

11. The computerized system according to claim 9, wherein said mobile computer software instructions verify that said user has captured at least the following photographic images of a shipping container:
   a. empty container,
   b. start of loading;
   c. container 25% loaded;
   d. container 50% loaded;
   e. container 75% loaded;
   f. container fully loaded with both doors open;
   g. container fully loaded with right door closed;
   h. container with both doors closed; and
   i. photo of sealed container.

12. The computerized system according to claim 1, wherein said mobile computer software instructions verify that all of said plurality of photographic images of said shipping container include a container number.

13. The computerized system according to claim 9, wherein said mobile computer software instructions automatically time-tags all of said plurality of photographic images of said shipping container.

14. The computerized system according to claim 9, wherein said mobile computer software instructions automatically upload all of said plurality of photographic images of said shipping container to said RMS web portal.

15. The computerized system according to claim 11, wherein said mobile computer software instructions automatically apply pattern recognition to self-authenticate that the seal photo contains a seal number.

16. The computerized system according to claim 9, wherein said mobile computer instructions employ pattern recognition to self-authenticate that the loading shots all contain a time-tags.

17. A system for automated management of container loading information and generating a property loading documentary assessment management system, comprising:
   a web-based client/server architecture including a plurality of remote client terminals each including a resident non-transitory computer-readable storage medium, one client terminal for each subscriber and one client terminal for each logistics agent, and a web server in direct communication with all of said client terminals through an Internet backbone;

a Uniform Resource Locator (URL) web portal including links to a plurality of index-tabbed webpages each including content for guiding the respective participants through all of the cargo container pre-shipment inspection process steps;

a central database of information stored on a non-transitory computer-readable storage medium resident on said web server and storing container records including booking number, container number, seal number, weight, or company reference number;

a modular array of web-based software stored on non-transitory computer-readable storage medium resident on said web server for data exchange with the various participants, said modular array of software further comprising at least the following software modules, a chat module for allowing subscribers to communicate in real time;

a contact module for allowing subscribers to retrieve contacts;

a pre inspection module comprising computer instructions for controlling data communication between said web server and any one of said remote client terminals and for executing the substeps of, guiding a subscriber to capture a plurality of photographic images of a shipping container, entering a booking number, container number, seal number, weight, and company reference number, automatically time-tagging each of said plurality of photo images, automatically formatting said plurality of images into a photo documentary report inclusive of said booking number, container number, seal number, weight, and company reference number, automatically uploading said inspection report to said central database; and providing a web portal comprising computer instructions stored on non-transitory computer memory for displaying a web-based interface for access by said subscriber to retrieve said photo documentary report, booking number, container number, seal number, weight, or company reference number and distribute said photo documentary report.

18. The system for automated management according to claim 17, wherein said web portal comprises computer instructions stored on non-transitory computer memory for displaying a web-based interface for access by said subscriber to submit a request for bids from logistics agents, and which receives and tracks responsive bids therefrom.

* * * * *